United States Patent
Arimoto et al.

(10) Patent No.: US 10,300,771 B2
(45) Date of Patent: May 28, 2019

(54) VEHICLE IMPACT ABSORPTION STRUCTURE

(71) Applicants: Toyota Jidosha Kabushiki Kaisha, Toyota-shi Aichi-ken (JP); Toyota Boshoku Kabushiki Kaisha, Kariya-Shi (JP)

(72) Inventors: Shinichi Arimoto, Okazaki (JP); Kohei Nasu, Miyoshi (JP); Taisuke Nonaka, Toyota (JP); Kazuhiro Kawamura, Toyota (JP); Yasuomi Tanaoka, Chiryu (JP)

(73) Assignees: Toyota Jidosha Kabushiki Kaisha, Toyota-shi (JP); Toyota Boshoku Kabushiki Kaisha, Kariya-shi (JP)

( * ) Notice: Subject to any disclaimer, the term of this patent is extended or adjusted under 35 U.S.C. 154(b) by 0 days.

(21) Appl. No.: 15/791,870

(22) Filed: Oct. 24, 2017

(65) Prior Publication Data
US 2018/0111454 A1 Apr. 26, 2018

(30) Foreign Application Priority Data
Oct. 26, 2016 (JP) .................. 2016-209873

(51) Int. Cl.
*B60J 5/00* (2006.01)
*B60J 5/04* (2006.01)
*B60R 13/02* (2006.01)

(52) U.S. Cl.
CPC ......... *B60J 5/0455* (2013.01); *B60R 13/0243* (2013.01)

(58) Field of Classification Search
CPC ...... B60J 5/0455; B60J 5/0456; B60J 5/0461; B60R 13/0243
USPC ....................................... 296/146.6
See application file for complete search history.

(56) References Cited

U.S. PATENT DOCUMENTS

| | | | |
|---|---|---|---|
| 8,215,699 B2* | 7/2012 | Suzuki | B60J 5/0451 296/146.6 |
| 2013/0147172 A1 | 6/2013 | Hirose et al. | |
| 2014/0035322 A1* | 2/2014 | Sakhara | B62D 25/02 296/187.12 |
| 2015/0123426 A1* | 5/2015 | Steinbrecher | B60R 13/0243 296/187.03 |

FOREIGN PATENT DOCUMENTS

| | | |
|---|---|---|
| JP | 2013-107442 A | 6/2013 |
| JP | 2013121745 A | 6/2013 |
| JP | 2014-028572 A | 2/2014 |

* cited by examiner

*Primary Examiner* — Dennis H Pedder
(74) *Attorney, Agent, or Firm* — Dinsmore & Shohl LLP (57) ABSTRACT

A vehicle impact absorption structure includes a door trim and an impact absorption member located on an outer side of the door trim in a vehicle width direction. The impact absorption member includes a base plate arranged to face the door trim, a plurality of legs extending from the base plate toward the door trim, and a plate-shaped rigid wall extending from the base plate toward the door trim. Each of the legs is bent between a distal end of the rigid wall and the base plate.

7 Claims, 3 Drawing Sheets

VEHICLE IMPACT ABSORPTION STRUCTURE

CROSS-REFERENCE TO RELATED APPLICATIONS

The present application claims priority to Japanese Patent Application No. 2016-209873 filed Oct. 26, 2016, the entire contents of which are incorporated herein by reference.

BACKGROUND

The present disclosure relates to a vehicle impact absorption structure.

Japanese Laid-Open Patent Publication No. 2013-107442 discloses a vehicle impact absorption structure, which includes an impact absorption member located on the outer side of a door trim in the vehicle width direction. The impact absorption member includes a base plate facing the door trim and a plurality of legs extending from the base plate toward the door trim. The distal ends of the legs are fixed to the door trim. The base plate of the impact absorption member includes plate-shaped rigid walls extending toward the door trim. Any impact applied to the vehicle from the outside in the vehicle width direction is transmitted to the rigid walls through the base plate of the impact absorption member. The rigid walls of the impact absorption member are deformed to limit transmission of the impact to the door trim.

With the vehicle impact absorption structure of the above-mentioned publication, only certain ones of the legs of the impact absorption member may be significantly deformed depending on the angle at which the impact is applied to the impact absorption member. Such significant deformation of the certain legs tilts the base plate, hampering effective transmission of the impact applied to the impact absorption member to the rigid walls through the base plate. As a result, the deformation of the rigid walls does net properly absorb the impact. That is, the vehicle impact absorption structure may not fully function as expected as an impact absorption member.

SUMMARY

To achieve the foregoing objective and in accordance with one aspect of the present disclosure, a vehicle impact absorption structure is provided that includes a door trim and an impact absorption member located on an outer side of the door trim in a vehicle width direction. The impact absorption member includes a base plate arranged to face the door trim, a plurality of legs extending from the base plate toward the door trim, and a plate-shaped rigid wall extending from the base plate toward the door trim. Each of the legs is bent between a distal end of the rigid wall and the base plate.

Other aspects and advantages of the present disclosure will become apparent from the following description, taken in conjunction with the accompanying drawings, illustrating by way of example the principles of the disclosure.

BRIEF DESCRIPTION OF THE DRAWINGS

The embodiments of the present disclosure, together with objects and advantages thereof, may best be understood by reference to the following description of the presently embodiments together with the accompanying drawings in which.

DETAILED DESCRIPTION OP THE EMBODIMENTS

Referring to FIGS. 1 to 5, one embodiment of the present disclosure is now described.

Figure 1:
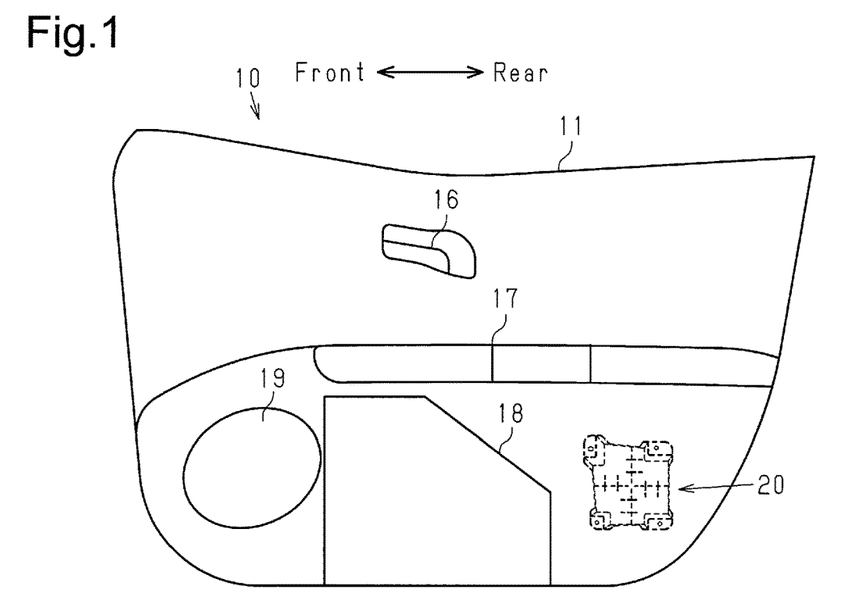
FIG. 1 is a diagram showing the inner surface of a door trim.

As shown in FIG. 1, a door trim 10 includes a trim board 11, which is plate-shaped as a whole. The side of the trim board 11 defining the passenger compartment (the side closer to the viewer of the sheet of FIG. 1) includes a door handle 16, which is used to open and close the door. The side of the trim board 11 defining the passenger compartment also includes an armrest 17 under the door handle 16 and a door pocket 18 under the armrest 17. The door pocket 18 may accommodate items such as maps and small articles. In addition, the trim board 11 includes a speaker unit 19 on the vehicle front side (on the left side as viewed in FIG. 1) of the door pocket 18.

Figure 4:
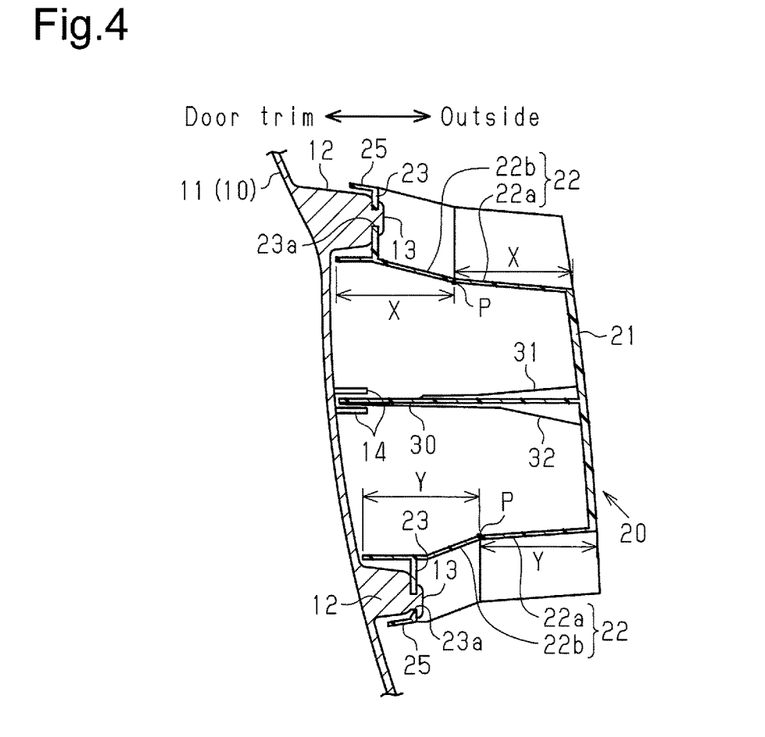
FIG. 4 is a cross-sectional view taken along line 4-4 in FIG. 3.

As shown in FIGS. 1 and 4, the outer side of the trim board 11 in the vehicle width direction includes an impact absorption member 20 located on one rear side of the door pocket 18. The impact absorption member 20 absorbs an impact applied from the outer side in the vehicle width direction. The outer side in the vehicle width direction corresponds to the right side as viewed in FIG. 4 and the opposite side/not shown) of the inner surface illustrated in FIG. 1. FIG. 1 virtually shows the impact absorption member 20 fixed to the trim board 11 with broken lines. The vehicle impact absorption structure of the present embodiment is configured by the does trim 10 and the impact absorption member 20.

Figure 3:
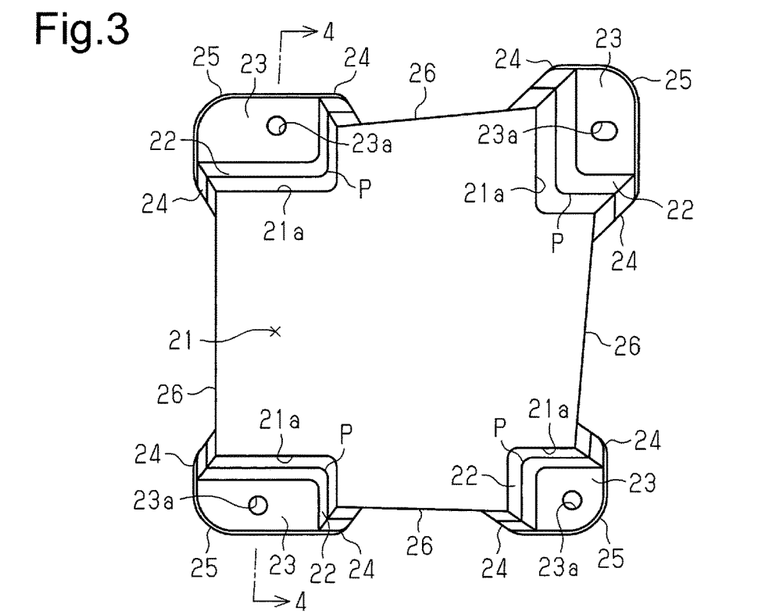
FIG. 3 is a plan view of the impact absorption member as viewed facing the base plate from the outside of the vehicle.

As shown in FIG. 4, the impact absorption member 20 includes a plate-shaped base plate 21, which faces the trim board 11 of the door trim 10. As shown in FIG. 3, a quadrilateral cutout section 21a is formed at each of the tour corners of the base plate 21. In a plan view, the base plate 21 has the shape of a quadrangle whose four corners are each cut out in the shape of a quadrangle.

Figure 2:
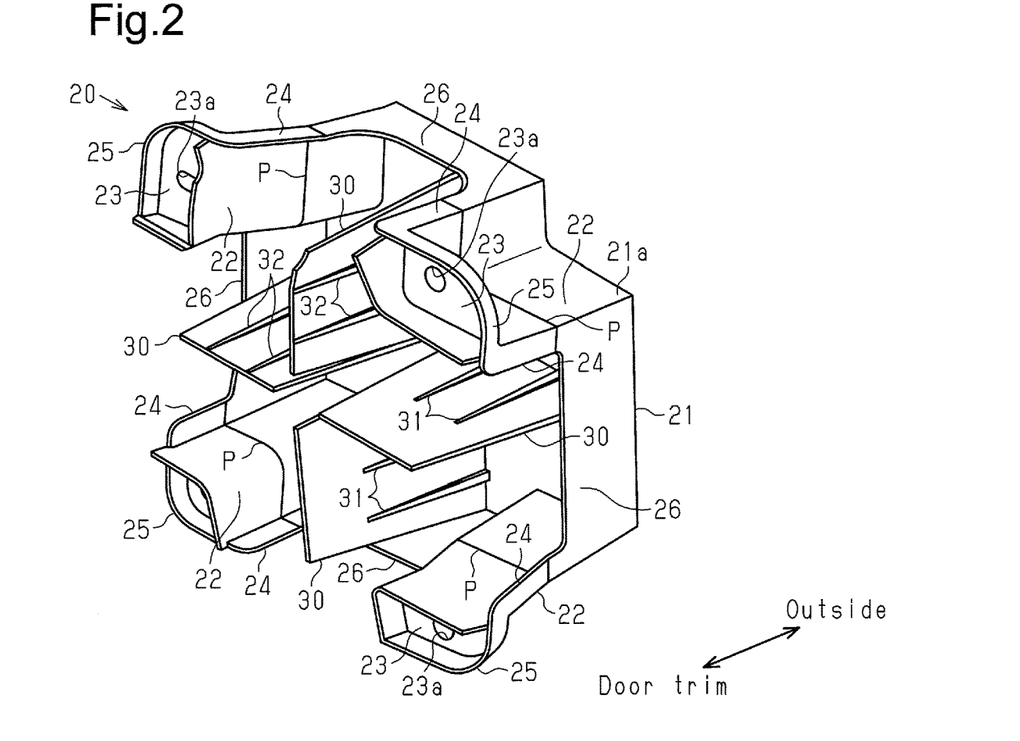
FIG. 2 is a perspective view showing an impact absorption member.

As shown in FIGS. 2 and 4, the impact absorption member 20 includes four legs 22 extending from the base plate 21 toward the trim board 11. The legs 22 correspond to the cutout sections 21a at the four corners of the base plate 21. Each leg 22 is a wall extending from, the cutout edge of the corresponding cutout section 21a of the base plate 21. The leg 22 has an L-shaped cross section. The length of each leg 22 from the base plate 21 is substantially equal to the distance between the base plate 21 and the trim board 11.

As shown in FIGS. 2 and 3, each leg 22 includes a plate-shaped attachment section 23 on the inner side of the L-shaped wall. The attachment section 23 extends substantially parallel to the base plate 21 and is located between the distal end of the leg 22 and the base plate 21. The attachment section 23 includes an attachment hole 23a in the center. The attachment hole 23a, which extends through the attachment section 23, is used to fix the impact absorption member 20 to the door trim 10.

Each leg 22 includes a first reinforcement wall 24 extending along each of the side edges of the leg 22. Each first reinforcement wall 24 forms an angle of about 90 degrees to the leg 22. Each first reinforcement wall 24 extends from the base plate 21 to a position near the attachment section 23.

A second reinforcement wall 25 projects from the outer edge of each attachment section 23. The second reinforcement wall 25 extends toward the trim board 11 and along the entire outer edge of the attachment section 23. The two ends of the second reinforcement wall 25 are continuous with the adjacent first reinforcement walls 24.

The outer edge of the base plate 21 includes plate-shaped side walls 26, each connecting the first reinforcement walls 24 of adjacent legs 22. The side walls 26 extend toward the trim board 11. The length of each side wall 26 from the base plate 21 is shorter than the length of the corresponding legs 22 from the base plate 21. In the present embodiment, the length of each side wall 26 from the base plate 21 is less than half the length of the corresponding legs 22 from the base plate 21.

As shown in FIG. 2, the impact absorption member 20 includes four rigid walls 30 extending from the base plate 21 toward the trim board 11 of the door trim 10. The rigid walls 30 are plate-shaped. The rigid walls 30 extend radially from the central section of the base plate 21 toward the middle points between adjacent legs 22. That is, as viewed from the trim board 11, the four rigid walls 30 are arranged to form a cross shape together. The center of the cross is located at the center of the base plate 21. The length of each rigid wall 30 from the base plate 21 is set such that a small gap is formed between the distal end of the rigid wall 30 and the trim board 11. Thus, the distal ends of the rigid walls 30 are not in contact with the trim board 11.

Figure 5:
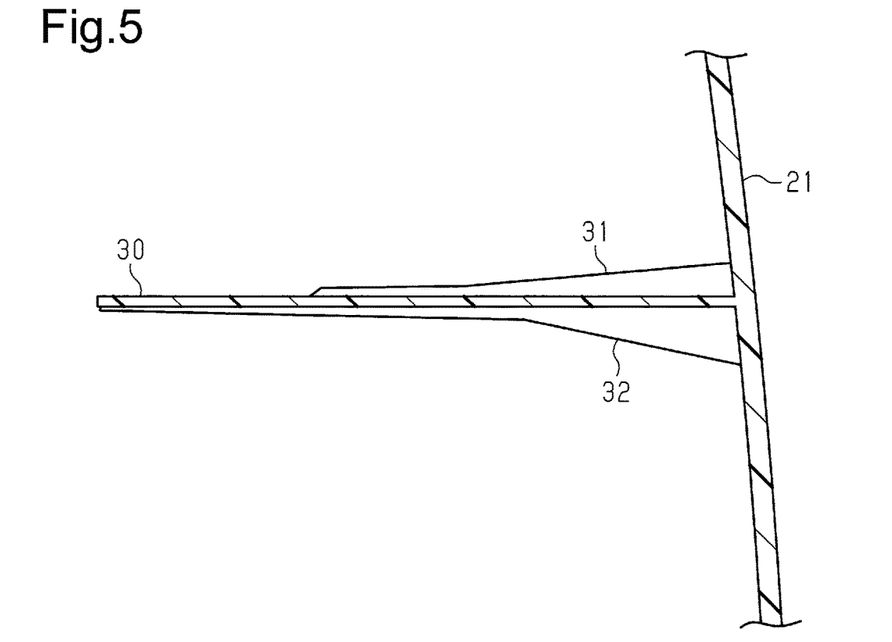
FIG. 5 is an enlarged view showing the rigid wall of FIG. 4.

Referring to FIG. 5, the first side (the upper side as viewed in FIG. 5) of each rigid wall 30 includes two first reinforcement ribs 31. The four rigid walls 30 include eight first reinforcement ribs 31 in total. Each first reinforcement rib 31 extends from the base plate 21 over two-thirds the length of the rigid wall 30. The projecting length of the first reinforcement rib 31 from the rigid wall 30 (the length in a substantially vertical direction as viewed in FIG. 5) decreases toward the distal end of the rigid wall 30. As shown in FIG. 2, the two first reinforcement ribs 31 on the first side of each rigid wall 30 are parallel and spaced apart from each other.

Referring to FIG. 5, the second side (the lower side as viewed in FIG. 5) of each rigid wall 30 includes two second reinforcement ribs 32. That is, the second reinforcement ribs 32 are located on the side opposite to the first side including the first reinforcement ribs 31. The four rigid walls 30 include eight second reinforcement ribs 32 in total. Each second reinforcement rib 32 extends over substantially the entire length of the rigid wall 30 from the base plate 21 to the distal end. The projecting length of the second reinforcement rib 32 from the rigid wall 30 (the length in a substantially vertical direction as viewed in FIG. 5) decreases toward the distal and of the rigid wall 30. The projecting length of the second reinforcement rib 32 decreases at a greater rate in the section corresponding to one-thirds the length from the base plate 21. The projecting length of the second reinforcement rib 32 decreases at a smaller rate in the section corresponding to two-thirds the length from the distal end of the second reinforcement rib 32. As shown in FIG. 2, the two second reinforcement ribs 32 on the second side of each rigid wall 30 are parallel and spaced apart from each other.

As shown in FIG. 4, the trim board 11 includes four support portions 12 and four attachment bosses 13 corresponding to the four legs 22 of the impact absorption member 20. The support portions 12 are columnar and extended outward in the vehicle width direction. Each attachment boss 13 extends from the distal end surface of the corresponding support portion 12 (the right surface as viewed in FIG. 4). Each attachment boss 13 is inserted into the attachment hole 23a of the corresponding attachment section 23 of the impact absorption member 20 and fixed by heat swaging.

As shown in FIG. 4, the trim board 11 includes four pairs of restriction pieces 14 corresponding to the four rigid walls 30 of the impact absorption member 20. FIG. 4 shows only one pair of restriction pieces 14. The restriction pieces 14 extend outward in the vehicle width direction. The two restriction pieces 14 in each pair race each other. The distance between the two restriction pieces 14 is greater than the thickness of the rigid walls 30 of the impact absorption member 20. The distal end of a rigid wall 30 is partially located between the two restriction pieces 14.

As shown in FIGS. 2 and 4, each leg 22 of the impact absorption member 20 is bent at a flexion position P. The direction in which the leg 22 extends changes at the flexion position P. Specifically, each leg 22 includes a proximal section 22a that extends between the base plate 21 and the flexion position P. The proximal section 22a extends substantially at a right angle to the base plate 21. The leg 22 also includes a distal section 22b that extends slightly outward from the flexion position P to the distal end. That is, the distal section 22b of each leg 22 extends toward the corresponding attachment hole 23a. As a result, a flexion line, which is the boundary between the proximal section 22a and the distal section 22b, is formed at the flexion position P of the leg 22.

As shown in FIG. 4, the flexion position P of each leg 22 is located between the distal end of the rigid wall 30 and the base plate 21. The flexion position P of each leg 22 of the present embodiment is located at the midpoint of the leg 22 in the extending direction of the rigid walls 30 (the sideward direction as viewed in FIG. 4). Thus, as for the leg 22 on the upper side shown in FIG. 4, for example, the section between the base plate 21 and the flexion position P and the section between the flexion position P and the distal end of the leg 22 have the same length X in the extending direction of the rigid walls 30. Similarly, as for the leg 22 on the lower side shown in FIG. 4, for example, the section between the base plate 21 and the flexion position P and the section between the flexion position P and the distal end of the leg 22 have the same length Y in the extending direction of the rigid walls 30. The same applies to the other legs 22.

The operation and the advantages of the vehicle impact absorption structure are now described.

An impact applied to the vehicle from the outside in the vehicle width direction imposes a load on the base plate 21 of the impact absorption member 20. This deflects the legs 22 of the impact absorption member 20 causing the base plate 21 to move toward the trim board 11. The distal ends of the rigid walls 30 come into contact with the trim board 11, and the impact from the outside in the vehicle width direction is transmitted to the rigid walls 30 through the base plate 21.

The length of the legs 22 from the base plate 21 is substantially equal to the distance between the base plate 21 and the trim board 11. That is, the distal ends of the legs 22 are in contact with the base plate 21, or the gaps between the distal ends of the legs 22 and the trim board 11, if any, are negligible. Thus, when the load of the impact acts on the base plate 21 of the impact absorption member 20, the distal ends of the legs 22 come into contact with the trim board 11 and transmit the load to the legs 22. This limits deformation of the impact absorption member 20 in unexpected locations, which would otherwise occur if an excessive load is applied to the attachment sections 23 and their adjacent areas of the impact absorption member 20, for example.

If each leg 22 extended in one direction that does not change from the proximal end to one distal end, only certain ones of the four legs 22 would be deformed when a load is applied at an angle to the base plate 21 of the impact absorption member 20, or when a load is disproportionately applied to a certain area of the base plate 21. Deformation of only certain legs 22 would cause the base plate 21 to tilt relative to the extending direction of the rigid walls 30, hindering appropriate application of the load to the rigid walls 30 through the base plate 21. Accordingly, the deformation of the rigid walls 30 would fall to properly absorb the impact.

In contrast, the four legs 22 of the present embodiment are all bent at the respective flexion positions P, so that the extending directions of the legs 22 change at the flexion positions P. This facilitates deformation of the legs 22 at the flexion positions P. Therefore, the all four legs 22 start to be deformed at the flexion positions P when a certain level of impact force is applied to the legs 22 even if the impact force is somewhat at angle to the base plate 21 of the impact absorption member 20. This reduces the likelihood that only some of the four legs 22 will be deformed.

When each leg 22 receives a loan through the case plate 21, the force that bends the leg 22 (bending moment) vends to be greater at the center of the leg 22 in the extending direction of the rigid walls 30. That is, the deformation of the leg 22 tends to start at the center. In the present embodiment, the flexion position P is set in the section that is easily deformed, increasing the possibility that the deformation of each leg 22 starts at the flexion position P. This limits unintentional deformation of the legs 22 at positions other than the flexion positions P.

Figure 6:
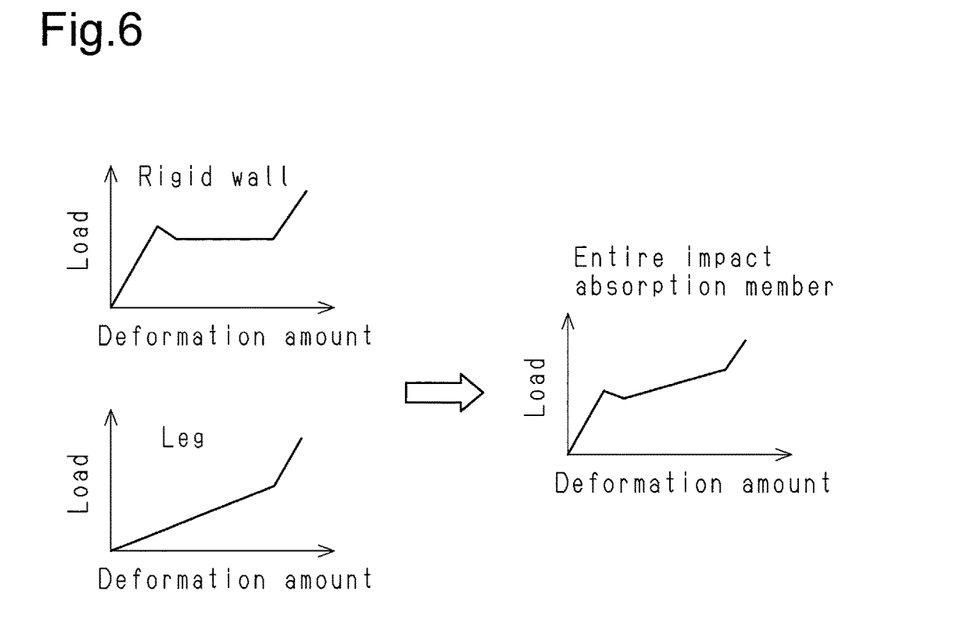
FIG. 6 is a diagram including graphs showing the relationship between the load applied to the impact absorption member and the deformation amount.

After the distal ends of the rigid walls 30 of the impact absorption member 20 come into contact with the trim board 11, the rigid walls 30 and the legs 22 receive the impact force transmitted through the base plate 21. As shown in FIG. 6, as the amount of deformation of the impact absorption, member 20 increases, the deflection of the rigid walls 30 and the bending of the legs 22 at the flexion positions P increase. Thus, the rigid walls 30 and the legs 22 each absorb an increasing amount of the load. The amount of deformation of the impact absorption member 20 is the amount of displacement of the base plate 21 toward the trim board 11. The distal end of each rigid wall 30 is located between the corresponding two restriction pieces 14 of the trim board 11. Thus, the position of the distal end of the rigid wall 30 does not move relative to the trim board 11 when the rigid wall 30 receives the load, reducing the possibility of collapsing of the rigid wall 30 at the proximal end.

When the amount of deformation of the impact absorption member 20 reaches a certain level, the rigid walls 30 are deformed, e.g. bent. Specifically, each rigid wall 30 is deformed, e.g. bent at the distal ends of the first reinforcement ribs 31 in the extending direction of the rigid wall 30, for example. After the rigid wall 30 is deformed, e.g. bent, the rigid wall 30 does not receive the load until the basal section of the bent rigid wall 30 comes into contact with the trim board 11. That is, as shown in FIG. 6, when a certain level of load acts on and deforms, e.g. bends the rigid wall 30, the amount of load absorbed by the rigid wall 30 does not increase for some duration after the deformation even if the amount of deformation of the impact absorption member 20 increases. In other words, the rigid wall 30 does not absorb the impact. In this duration in which the rigid walls 30 do not absorb the load, the four legs 22 receive the load through the base plate 21. As the amount of deformation of the impact absorption member 20 increases the legs 22 are deformed and absorb an increasing amount of load.

As the load acting on the base plate 21 increases, the distal end of the basal section of each rigid wall 30, which has been deformed, e.g. bent comes into contact with the trim board 11. After the distal end of the basal section of the rigid wall 30 cores into contact with the trim board 11, the basal section of the rigid wall 30 may be deflected to receive the load. Thus, as shown in FIG. 6, as the amount of deformation of the impact absorption member 20 increases, the amount of load absorbed by the rigid walls 30 (the basal sections) increases.

When the amount of deformation of each leg 22 starting at the flexion position P reaches a specific amount, the deformation starting at the flexion position P will no longer be possible. After the leg 22 becomes incapable of further deformation at the flexion position P, the proximal section 22a of the leg 22 becomes deformed, e.g. deflected. Accordingly, even after the deformation at the flexion position P becomes impossible, each leg 22 (the proximal section 22a) absorbs an increasing amount of load as the deformation on amount of the impact absorption member 20 increases, as shown in FIG. 6. While the leg 22 is easily deformed at the flexion position P, the proximal section 22a of the leg 22 resists deformation due to lack of a structure equivalent to the flexion position P. Therefore, as shown in FIG. 6, the proximal section 22a of the leg 22 requires a greater amount of load to undergo a certain amount of deformation (the inclination in the graph of FIG. 6) than the entire leg 22 including the flexion position P.

As shown in FIG. 6, the deformation of the rigid walls 30 and the legs 22 as described above allows the impact absorption member 20 as a whole to have the characteristic of generally absorbing an increasing amount of load as the deformation amount increases over a relatively wide range of deformation. Accordingly the impact absorption member 20 absorbs the load for a sufficiently long time after the beginning of deformation, effectively limiting application of the impact force to the door trim 10.

The above mentioned embodiment may be modified as follows.

The structure of the door trim 10 may be modified. The door trim 10 may be modified according to the structure of the vehicle as long as the door trim 10 includes a plate-shaped member to which the impact absorption member 20 can be fixed (the trim board 11 in the embodiment described above). For example, some of the components described in the above embodiment may be omitted, and other structures may be added.

The shape of the base plate 21 of the impact absorption mercer 20 in a plan view is not limited to the shape described above. For example, the base plate 21 may be circular in a plan view. Further, the base plate 21 does not have to be flat as a whole and may be partially curved or include steps. That is, the base plate 21 may have any shape as long as it is plate-shaped as a whole.

Reinforcement members such as ribs may be formed on the side of one base plate 21 opposite to the door trim 10 (the outer side in the vehicle width direction).

The number of the legs 22 extending from the base plate 21 may be modified to any number greater than one. The advantages of the embodiment described above are achieved when there are two or more legs 22 whose extending directions change at the flexion positions P.

The leg 22 does not have to be shaped as a wall having an L-shaped cross section. For example, the leg 22 may nave the shape of a tube, such as a circular tube or a polygonal tube, or may be a solid bar.

Each leg 22 of the present embodiment is bent such that the distal section 22b of the leg 22 extends outward toward the distal end. However, the leg 22 may be modified as long as the leg 22 is bent such that the extending direction changes at the flexion positron P. For example, the extending direction of the leg 22 may change such that the distal section 22b of the leg 22 extends toward the center of the base plate 21 from the proximal section 22a.

Further, not all the legs 22 have to extend outward or inward, and some legs 22 may be modified to extend outward while the other legs 22 may be modified to extend inward. In some embodiments, the side to which the extending direction of each leg 22 is directed is selected so as to avoid interference between the rigid walls 30 and the leg 22 after the leg 22 is deformed so as to be bent at the flexion position P.

The embodiment described above has a flexion line at the flexion position P of each leg 22. However, depending or the material of the legs 22 and the method for manufacturing the impact absorption member 20 including the legs 22, each leg 22 may be curved about the flexion position P without forming a clear flexion line.

Each leg 22 may include a plurality of flexion positrons P. For example, each of the four legs 22 may be bent at two flexion positions P. That is, each leg 22 may change its extending direction at two flexion positions P. When the legs 22 are highly rigid and providing only one flexion position P may not be sufficient to deform all the four legs 22, providing a plurality of flexion positions P may facilitate deformation of the legs 22.

The flexion position P of each leg 22 does not have to be located at the midpoint of the leg 22 in the extending direction of the rigid walls 30. As long as all the legs 22 change their directions at the respective flexion positions P, a slight deviation of the flexion position P froze the midpoint of each leg 22 is unlikely to result in deformation of only some of the legs 22.

The number and the position of the rigid walls 30 may be modified. The appropriate number and position of the rigid walls 30 may be determined based on the factors such as the thickness and material of the rigid walls 30 and the amount of impact force (load) the rigid walls 30 need to absorb.

The four rigid walls 30 may be integral to one another so as to form a rigid wall 30 having a cross-shaped cross section. Such a rigid wall 30 is still considered as a plate-shaped member.

The structures of the first reinforcement ribs 31 and the second reinforcement ribs 32 of the rigid walls 30 may also be modified. For example, the projecting length or each of the first reinforcement ribs 31 and the secure reinforcement ribs 32 from the rigid wall 30 may be uniform over the entire extent from the proximal end to the distal end of the rigid wall 30. Either or both of the first reinforcement ribs 31 and the second reinforcement ribs 32 may be omitted, and other reinforcement members such as ribs may be provided in addition to the reinforcement ribs 31 and 32.

The impact absorption member 20 may be fixed to the trim board 11 by means such as bolts or an adhesive, instead of heat swaging. Further, the impact absorption member 20 may be fixed to the trim board 11 by engaging or securing the legs 22 to the trim board 11.

The restriction pieces of the trim board 11 do not have to be in pairs. The trim board 11 may include only one restriction piece 14. Depending on the factors such as the extending direction of the rigid walls 30 and the structures of the first reinforcement ribs 31 and the second reinforcement ribs 32 of the impact absorption member 20, the distal end of each rigid wall 30 may have a tendency to move to one side in the thickness direction of the rigid wall 30. As long as each restriction piece 14 is placed on the side to which the distal end of the corresponding rigid wall 30 tends to move, two restriction pieces 14 are not required to suitably limit movement of the distal end of the rigid wall 30.

The restriction pieces 14 of the trim, board 11 may be omitted. In this case, each rigid wall 30 of the impact absorption member 20 may be fixed to the trim board 11 by a fastener such as a bolt to limit movement of the distal end of the rigid wall 30. If the rigid wall 30 is strong enough to resist collapsing at the proximal end, the distal end of she rigid wall 30 does not have to be fixed.

Therefore, the present examples and embodiments are to be considered as illustrative and not restrictive and the present disclosure is not to be limited to the details given herein, but may be modified within the scope and equivalence of the appended claims.

The invention claimed is:

1. A vehicle impact absorption structure comprising:
   a door trim; and
   an impact absorption member located on an outer side of the door trim in a vehicle width direction, wherein
   the impact absorption member includes
   a base plate arranged to face the door trim, the base plate includes a cutout section formed at each corner of the base plate
   a plurality of legs extending from an edge of a corresponding cutout section of the base plate toward the door trim, and
   a plate-shaped rigid wall extending from the base plate toward the door trim, and
   each of the legs is bent between a distal end of the rigid wall and the base plate.

2. The vehicle impact absorption structure according to claim 1, wherein a position at which each leg is bent is located at a midpoint of the leg in an extending direction of the leg.

3. The vehicle impact absorption structure according to claim 1, wherein
   a section of each leg located between the base plate and a position at which the leg is bent extends substantially at a right angle to the base plate, and
   a section of each leg between a distal end of the leg and the position at which the leg is bent extends outward.

4. The vehicle impact absorption structure according to claim 1, wherein the plurality of legs includes four legs, each located at a corresponding one of four corners of the base plate.

5. A vehicle impact absorption structure comprising:
   a door trim; and
   an impact absorption member located on an outer side of the door trim in a vehicle width direction, wherein the impact absorption member includes
- a base plate arranged to face the door trim, the base plate has a shape of a quadrangle whose four corners are each cutout,
- four legs extending from a corresponding cutout at the four corners of the base plate toward the door trim, and
- a plate-shaped rigid wall extending from the base plate toward the door trim, and each of the legs is bent between a distal end of the rigid wall and the base plate.

6. The vehicle impact absorption structure according to claim 5, wherein a position at which each leg is bent is located at a midpoint of the leg in an extending direction of the leg.

7. The vehicle impact absorption structure according to claim 5, wherein
- a section of each leg located between the base plate and a position at which the leg is bent extends substantially at a right angle to the base plate, and
- a section of each leg between a distal end of the leg and the position at which the leg is bent extends outward.

\* \* \* \* \*

UNITED STATES PATENT AND TRADEMARK OFFICE
CERTIFICATE OF CORRECTION

PATENT NO. : 10,300,771 B2
APPLICATION NO. : 15/791870
DATED : May 28, 2019
INVENTOR(S) : Shinichi Arimoto et al.

It is certified that error appears in the above-identified patent and that said Letters Patent is hereby corrected as shown below:

In the Specification

In Column 2, Line 35, before "rear", delete "one" and insert --the-- therefor.

In Column 2, Line 40, after "side", delete "/" and insert --(--, therefor.

In Column 2, Line 44, before "trim", delete "does" and insert --door--, therefor.

In Column 2, Line 49, before "corners", delete "tour" and insert --four--, therefor.

In Column 2, Line 57, after "from", delete ",".

In Column 4, Line 20, after "pair", delete "race" and insert --face--, therefor.

In Column 5, Line 34, delete "loan" and insert --load--, therefor.

In Column 5, Line 34, delete "case" and insert --base--, therefor.

In Column 5, Line 35, delete "vends" and insert --tends--, therefor.

In Column 6, Line 11, after "increases", insert --,--.

In Column 6, Line 17, delete "cores" and insert --comes--, therefor.

In Column 6, Line 32, after "deformation", delete "on".

In Column 7, Line 10, after "may", delete "nave" and insert --have--, therefor.

In Column 7, Line 36, delete "positrons" and insert --positions--, therefor.

Signed and Sealed this
Twenty-third Day of July, 2019

Andrei Iancu
*Director of the United States Patent and Trademark Office*

CERTIFICATE OF CORRECTION (continued)
U.S. Pat. No. 10,300,771 B2

In Column 7, Line 48, delete "froze" and insert --from--, therefor.

In Column 8, Line 21, after "trim", delete ",".

In Column 8, Line 26, delete "she" and insert --the--, therefor.